Aug. 4, 1964          R. WEISS ETAL          3,143,052
                      CAMERA CONSTRUCTION

Filed July 7, 1961                           2 Sheets-Sheet 1

United States Patent Office 3,143,052
Patented Aug. 4, 1964

3,143,052
CAMERA CONSTRUCTION
Richard Weiss and Claus Prochnow, Braunschweig, Germany, assignors to Franke & Heidecke, Fabrik Photographischer Präzisions-Apparate, Braunschweig, Germany, a German firm
Filed July 7, 1961, Ser. No. 122,465
Claims priority, application Germany July 15, 1960
2 Claims. (Cl. 95—44)

The present invention relates to the construction of a photographic camera, and more particularly a camera of the twin lens reflex type. Such a camera is sometimes called a twin lens mirror reflex focusing viewfinder camera.

In many cameras of this general type, there is a lens carrier or movable front mounted at the front of the camera body, which body contains a lower picture taking or exposure chamber and an upper viewfinder or focusing chamber. A picture taking or exposure lens and a viewfinder or focusing lens are both mounted on the movable front, and are simultaneously moved forwardly and backwardly during the focusing operation, controlled by a focussing knob projecting from one side wall (usually the left-hand side) of the camera body.

An object of the present invention is the provision of a generally improved and more satisfactory twin lens reflex camera.

Another object is the provision of a twin lens reflex camera so designed as to retain the focusing function of both the finder lens and the exposure or picture lens, while eliminating the movable front and eliminating the focusing knob heretofore projecting from the side wall of the camera.

A further object is the provision of a simplified twin lens reflex camera, particularly designed for use with a modern automatic shutter and diaphragm unit, thereby enabling a simplification of the construction and operation of the camera.

A still further object is the provision of a twin lens reflex camera having two adjusting or setting knobs in the familiar locations between the two lenses, but in which these setting knobs perform different setting functions than those performed by the similarly located knobs in the familiar cameras of the prior art.

Figure 1:
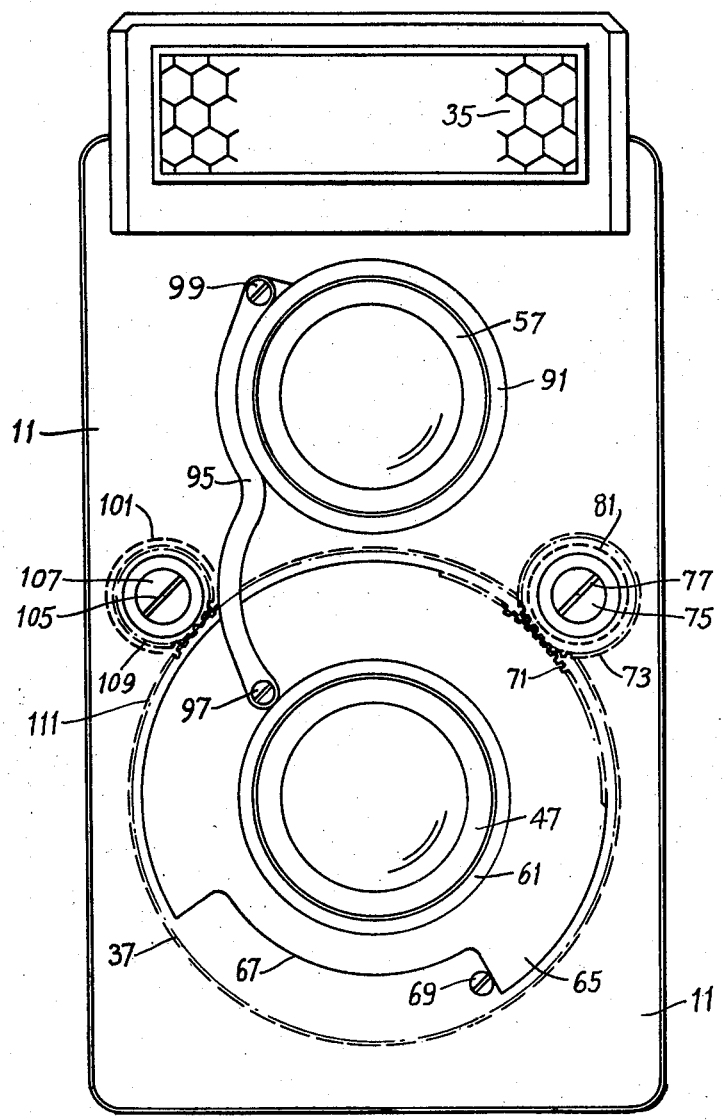
Figure 2:
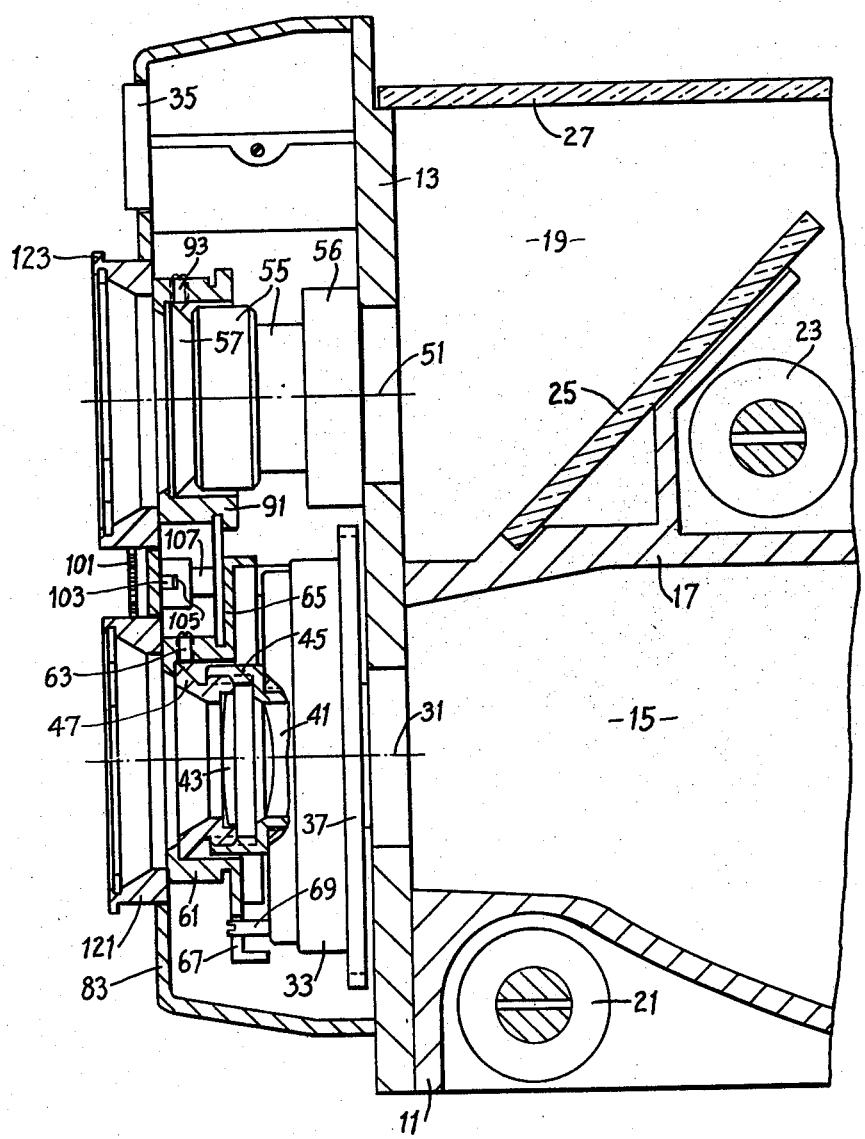

These and other desirable objects may be attained in the manner disclosed as an illustrative embodiment of the invention in the following description and in the accompanying drawings forming a part hereof, in which:

FIG. 1 is a somewhat diagrammatic front elevation of a camera in accordance with a preferred embodiment of the present invention, with parts removed in order to show underlying parts; and FIG. 2 is a somewhat diagrammatic or schematic vertical section taken along the optical axis of a camera in accordance with a preferred embodiment of the present invention, with various parts omitted.

As is understood by those familiar with twin lens reflex cameras, there are certain well known and widely used types of such cameras, such as the "Rolleiflex and Rolleicord" cameras manufactured by the firm of Franke & Heidecke in Braunschweig, Germany, and widely used in the United States and elsewhere, in which the exposure lens and the finder lens are both mounted for conjoint movement on a movable front on the camera body, and in which the movable front carries two setting or adjusting knobs located partly between the two lenses, one on each side of the vertical center line. In the prior familiar constructions, one of these setting knobs serves to adjust the shutter speed, and the other serves to adjust the diaphragm aperture.

According to the present invention, the two setting knobs are retained in the same or substantially the same location, so that the front of the camera has an appearance quite similar to the appearance which has become familiar to many users of the above mentioned specific cameras, but these knobs in the present invention perform somewhat different functions and, indeed, perform all the necessary normal setting or adjusting functions which are normally needed to make the camera ready for taking a picture, except the functions of advancing the film, which simultaneously tensions or cocks the shutter, and releasing the shutter to make the actual exposure.

Referring now to the drawings, the camera in its preferred form comprises a body indicated in general at 11, having a front wall 13 which in the present case is stationary rather than being movable forwardly and backwardly for focusing as in the familiar cameras above mentioned. In the bottom portion of the camera is the exposure chamber or picture taking chamber 15, separated by a partition 17 from the finder chamber or focusing chamber 19 in the upper part of the camera body. Film is supplied from a film supply roll 21 at the bottom of the camera, and is drawn across the focal plane (not shown) at the rear of the exposure chamber 15 and is wound up on the film take-up roll 23. Light entering the focusing or finder chamber 19 through the finder lens is reflected upwardly by the inclined mirror 25 and falls on the lower face of the focusing screen or viewing screen 27 which extends horizontally across the top of the finder chamber 19.

All of the parts thus far described may be of the familiar or conventional construction, except for the fact that in the present instance the front wall 13 is stationary instead of being mounted for forward and backward focusing movement.

Mounted on the stationary wall 13, in proper alinement with the main or picture taking optical axis 31, is a shutter and diaphragm unit 33 of the so-called automatic "program" type. Such units, although of fairly recent origin, are now known in the art. In units of this kind, there is an "automatic" setting position in which the mechanism automatically sets both the shutter speed and the diaphragm aperture, depending upon the illumination conditions as read or sensed by a photoelectric cell the front portion of which is indicated diagrammatically at 35.

In a typical form of program shutter, and in the form which is preferably used in accordance with the present invention, relatively dim illumination conditions serve to set the mechanism for taking a picture at a relatively slow shutter speed and at a relatively large diaphragm aperture. Successively brighter and brighter illumination conditions will serve not only to adjust the shutter timing to a faster speed, but also to adjust the diaphragm aperture to a smaller aperture, until finally, at the brightest illumination conditions, the mechanism will be set to make an exposure at the fastest shutter speed (shortest duration of exposure) and at the smallest diaphragm aperture.

As above stated, this is the way the shutter and diaphragm unit operates when set to the "automatic" position. However, for special situations or for taking flash light photographs, it is possible to set the mechanism manually to any given selected diaphragm aperture.

The adjustment of the shutter and diaphragm unit 33 to the automatic or "program" position, or to the non-automatic or manual position, as well as the adjustment of the diaphragm aperture to a given value when the parts are set for non-automatic operation, is performed by rotating the setting or adjusting ring 37 mounted on the casing or housing of the shutter and diaphragm unit 33, for rotation thereon about the optical axis 31. The details of the interior construction of the shutter and diaphragm unit, and the details of the way in which the rotation of the setting ring 37 serves to set the interior mechanism, are not important for purposes of the present invention, and such details may be of conventional known form.

Mounted in front of the shutter and diaphragm unit 33, and in alinement with the optical axis 31, is the picture taking lens or exposure lens or objective, a portion of which is indicated at 41. As customary in high grade photographic objective, the lens as a whole is preferably made up of a plurality of components or elements, the front one of which is indicated at 43. In the prior art construction above mentioned, where a movable front member is mounted on the camera body, the entire objective is mounted on the movable front member and all elements or components of the objective move axially together, for focusing purposes. In the construction of the present invention, wherein the front wall member 13 of the camera is fixed rather than movable, the objective or at least a part thereof is in a focusing mount and is focused by rotation around the optical axis as a center, but it is immaterial for purposes of the present invention whether all elements or components of the lens are in a focusing mount, or whether (as is customary in many modern photographic objectives) certain of the elements or components are axially fixed and other elements or components are axially movable for focusing. In the construction here shown as an example, the rear element or elements are in a fixed mount 45 which is, for example, fixed to and supported by the front wall of the shutter and diaphragm unit 33, while the front element 43 of the lens is in the focusing mount 47 connected by screw threads to the stationary mount 45 in such manner that rotation of the mount 47 about the optical axis 31 will cause axial displacement of the mount 47 and the front element 43, to effect proper focusing of the picture-taking objective.

A similar arrangement is used for the focusing or view-finding objective or lens, which is mounted above the exposure objective 41, 43, on the finder axis 51. The viewfinder objective or lens may comprise any desired number of separate components or elements (not necessarily the same number as those used in the photographic objective) and, as in the case of the photographic lens, it is immaterial for purposes of the present invention whether the entire lens moves axially for focusing, or whether only certain of the components move axially for focusing. In the preferred construction here shown as an illustrative example, the main portion of the finder lens is held axially stationary within the mount portion 55 which is held by a tubular support 56 extending forwardly from the stationary front wall 13 of the camera, and the front element or component of the finder lens is mounted in the focusing mount 57 to move axially for focusing purposes upon rotation of the focusing mount 57 about the optical axis 51 of the finder lens.

A sleeve 61 is mounted on and supported by the focusing mount 47, and is operatively connected to it by a set screw 63, so that rotation of the sleeve 61 will cause corresponding rotation of the focusing mount and axial travel thereof for focusing purposes. This sleeve 61 has at its rear end a radial flange 65, cut away through part of its circumference as at 67 (see FIG. 1) and cooperating with a stationary stop pin 69 secured to the shutter casing 33, serving to limit the extent to which the flange 65 can rotate.

On another portion of its periphery, the flange 65 is provided with gear teeth 71 meshing with the teeth of a pinion 73 fixed to a shaft 75 mounted for rotation about an axis parallel to the optical axis 31. The enlarged front end of the shaft 75 has a diametrical driver slot or groove 77 for engagement with a corresponding diametrical driver tongue on the rear end of the short shaft or hub of an adjusting knob 81 mounted for rotation on the removable cup-like or cap-like front cover member 83 which is detachably mounted in any convenient way on the stationary front wall 13 of the camera body. If the front cover 83 is removed to obtain access to the parts within, for adjustment or repair, the adjusting knob 81 comes away with it, the driver tongue simply pulling out of the driver slot 77 of the shaft 75 which stays with the parts secured to the wall 13. When the cover 83 is replaced, the driver tongue slips back into the slot 77, if properly oriented with respect thereto.

The focusing mount 57 of the finder lens is provided with a sleeve 91 which may be similar to the sleeve 61 of the exposure lens mount, and is similarly fastened to its mount 57, by a set screw 93. Like the sleeve 61, the sleeve 91 preferably is supported and guided by its respective focusing mount 57. However, the sleeve 91 does not have any radial flange like the flange 65 of the sleeve 61, and does not have any gear teeth like the gear teeth 71. Instead, the sleeve 91 is operatively connected to the sleeve 61 to turn therewith and to the same extent, by means of a link 95 pivotally connected to the flange 65 of the sleeve 61 by the pivot screw 97 and pivotally connected to a small arm on the sleeve 91 by the pivot screw 99. Since the maximum range of rotation of the two sleeves is considerably less than half a revolution (actually only about a quarter of a revolution, or a little less than this) the link 95 furnishes an adequate connection between the two sleeves, so that any rotation imparted to the sleeve 61 by movement of the adjusting knob 81 will likewise be imparted, through the link 95, to the sleeve 93. Thus both of the focusing lens mounts 47 and 57 will be turned in the same direction and to the same degree, thereby focusing the finder lens or objective to the same relative focusing position as that of the picture taking or exposure objective, which is the essential condition for proper operation of a twin lens reflex camera, as well understood in the art. During initial assembly, the focusing movements of the lenses can be properly calibrated with each other and with the focusing scale (if any) associated with the setting knob 81, by loosening the set screws 63 and 93 and turning the respective sleeves and mounts relative to each other to any necessary extent.

The focusing knob 81 is located in the familiar position of one of the two setting knobs heretofore customarily used on "Rolleiflex" and "Rolleicord" cameras; that is, in a position approximately midway, in a vertical direction, between the exposure lens and the finder lens, and in a position offset laterally from the vertical plane containing the two optical axes of these two lenses. In a similar position offset laterally on the other side of such vertical plane, is another setting knob 101 having a short shaft mounted for rotation in the front cover member 83, similar to that of the other setting knob 81. Just as in the case of the other or first setting knob, the short shaft of the second setting knob has a driver tongue or projection 103 which fits into the diametrical driver slot 105 at the front end of a second adjusting or setting shaft 107 which serves for making the necessary setting of the automatic "program" shutter and diaphragm unit 33. For example, the rear end of this second setting shaft 107 may have fixed to it a toothed pinion 109 meshing with gear teeth 111 on the periphery of the setting ring 37 mounted for rotation on the unit 33. External finger pressure applied to the second setting knob thus serves to rotate the ring 37 to any desired position. As already mentioned, and as will be readily understood by those familiar with this recently introduced type of automatic program unit, one rotary position of the ring 37 sets the mechanism for completely automatic operation of both shutter speed and diaphragm aperture under the control of the photoelectric cell 35 of the built-in light meter, and a series of other rotary positions of the ring 37 serve respectively to determine manually various diaphragm apertures desired by the operator, for special circumstances such as for use with flash photography. When the diaphragm aperture is set manually in this manner, the shutter speed mechanism operates at an invariable speed of, for example, $\frac{1}{30}$ of a second.

The detachable cover member 83 also carries two bayonet mounting rings, a lower ring 121 in alinement with the optical axis 31 of the exposure lens, and an upper bayonet mounting ring 123 in alinement with the optical axis 51 of the finder lens. These two bayonet mounting rings 121 and 123 serve, as usual, for mounting filters or supplementary lenses or sun shades or other desired accessories or attachments in front of either or both of the two lenses of the camera, i.e., the picture taking lens and the finder lens.

With this arrangement, it is seen that the construction of the camera itself as well as the setting or adjustment thereof, are greatly simplified. It is no longer necessary to provide the sturdy and accurate guides heretofore needed for the movable front member of the camera. Instead, the comparatively simple focusing lens mounts are supported from the stationary front wall 13 of the camera. It is no longer necessary to provide the focusing knob projecting from the side wall of the camera, and so the over-all width of the camera is reduced, and it is easier to insert the camera in or remove it from a carrying case. The danger of something accidentally hitting and injuring the projecting focusing knob is eliminated. All necessary settings to make the camera ready for taking a particular picture, are performed by the two adjusting knobs on the front wall, located in the customary positions already familiar to users of the "Rolleiflex" and "Rolleicord" cameras. One of these two adjusting knobs serves for focusing the camera (simultaneously focusing the picture taking lens and the finder lens in their respective focusing mounts) and the other one of the two adjusting knobs now serves for making all necessary adjustments of the automatic "program" shutter and diaphragm unit, setting it either for normal fully automatic operation, or for manual adjustment of the diaphragm aperture to take care of special situations such as flash exposures. Except for the omission of the laterally projecting focusing knob heretofore used, the general over-all appearance of the camera is approximately the same as that of the particular cameras above specifically mentioned, and the film winding and shutter tensioning and releasing mechanism can be the same as in the mentioned prior cameras.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A twin lens reflex camera comprising a picture taking lens and a finder lens spaced vertically from each other, each of said lenses having a focusing lens mount rotatable to focus its respective lens, a shutter and diaphragm unit in optical alinement with said picture taking lens, a shutter setting ring rotatable on said unit, a front wall supporting said unit and lens mounts and lenses, a cover detachably mounted on said front wall and having a portion spaced forwardly from said front wall to enclose said unit and said lens mounts, means operatively coupling the two lens mounts to each other to turn together, a first shaft and a second shaft each supported from said front wall for rotation about respective axes substantially parallel to the optical axis of said picture taking lens, an operative connection between said first shaft and one of said focusing lens mounts so that rotation of said first shaft will rotate both of said focusing lens mounts to focus both of said lenses simultaneously, an operative connection between said second shaft and said setting ring on said unit so that rotation of said second shaft will adjust the position of said setting ring, a first manually rotatable setting knob and a second manually rotatable setting knob each mounted on said cover and located respectively in axial alinement with said first and second shafts, and means forming an axially detachable driving connection between each of said setting knobs and its respective shaft when said cover is in normal operative position on said front wall, said driving connection being so formed that when said cover is detached and moved forwardly away from said front wall, said driving connections will separate and said knobs will come away with said cover and said shafts will remain with said front wall.

2. A construction as defined in claim 1, in which said operative connection between said first shaft and one of said focusing lens mounts includes a sleeve mounted on said one of said lens mounts and rotationally adjustable thereon, a set screw for holding said sleeve in a given position of orientation on its lens mount, gear teeth on said sleeve, and a pinion on said first shaft for meshing with said gear teeth.

References Cited in the file of this patent

UNITED STATES PATENTS

| | | |
|---|---|---|
| 1,201,508 | Schantz | Oct. 17, 1916 |
| 2,042,983 | Fairchild | June 2, 1936 |
| 2,235,743 | Gagliardi | Mar. 18, 1941 |
| 2,385,804 | Fitz | Oct. 2, 1945 |
| 2,800,842 | Albrecht | July 30, 1957 |
| 2,990,756 | Weiss | July 4, 1961 |